United States Patent [19]

Nettmann

[11] Patent Number: 4,683,770

[45] Date of Patent: Aug. 4, 1987

[54] BALANCING GEAR APPARATUS FOR REMOTE POSITIONING DEVICE

[75] Inventor: Ernst F. Nettmann, Los Angeles, Calif.

[73] Assignee: Matthews Studio Electronics, Burbank, Calif.

[21] Appl. No.: 749,283

[22] Filed: Jun. 27, 1985

[51] Int. Cl.[4] ............................................. F16H 1/16
[52] U.S. Cl. ......................................... 74/425; 74/405
[58] Field of Search ...................... 74/406, 405, 89.14, 74/425

[56] References Cited

U.S. PATENT DOCUMENTS

| | | | |
|---|---|---|---|
| 676,787 | 6/1901 | Wagner | 74/405 |
| 721,859 | 3/1903 | Buffum | 74/405 |
| 729,538 | 6/1903 | Buffum | 74/405 |
| 907,940 | 12/1908 | Zachow et al. | 74/405 |
| 937,169 | 10/1909 | Noepel | 74/425 X |
| 1,000,084 | 8/1911 | Frederickson | 74/425 X |
| 1,586,536 | 6/1926 | Power | 74/405 |
| 2,598,383 | 5/1952 | Holzauser | 74/405 |
| 2,771,169 | 11/1956 | Wahlstrom | 74/405 |
| 2,989,874 | 6/1961 | Johnson | 74/405 |
| 3,268,268 | 8/1966 | Schwalm | 74/425 X |
| 4,187,734 | 2/1980 | Mann | 74/405 |
| 4,287,782 | 9/1981 | Ruschek | 74/405 |

Primary Examiner—Allan D. Herrmann
Attorney, Agent, or Firm—Michael A. Painter

[57] ABSTRACT

The present invention comprises a balancing gear assembly employed to statically balance a camera or like equipment mounted upon angular positioning equipment. Remote angular positioning equipment for a camera or other similar devices permits remote angular positioning along the perpendicular axes of rotation of the equipment. The driving force to the camera along each of the two axes is supplied through a separate driving gear. The present invention balancing gear apparatus is disposed between each of the drive gears and the power source for rotating the drive gear. The power source is coupled to a worm gear through a universal joint which permits 360° rotation of the shaft upon which the worm gear is mounted. The worm gear is appropriately journaled within a yoke which is moveable in the plane of the drive gear. The yoke supporting the rotatable worm gear can be positioned to engage the worm gear and the drive gear during operation. Moving the yoke to the alternate position disengages the worm gear and the drive gear leaving the camera equipment disengaged from the motive force and permitting static balancing of the camera in the respective plane of movement.

1 Claim, 5 Drawing Figures

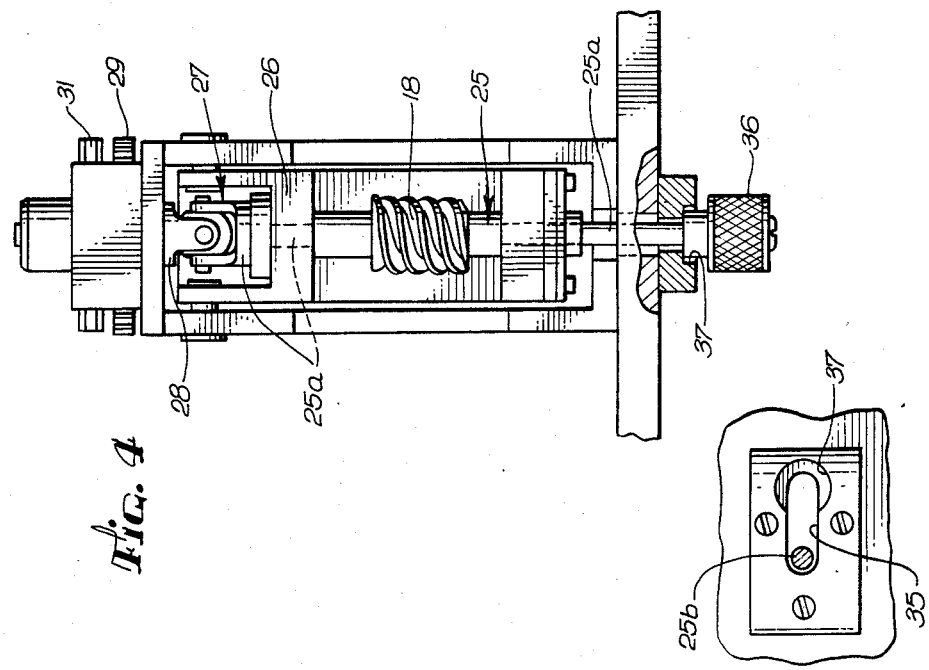
Fig. 4
Fig. 5
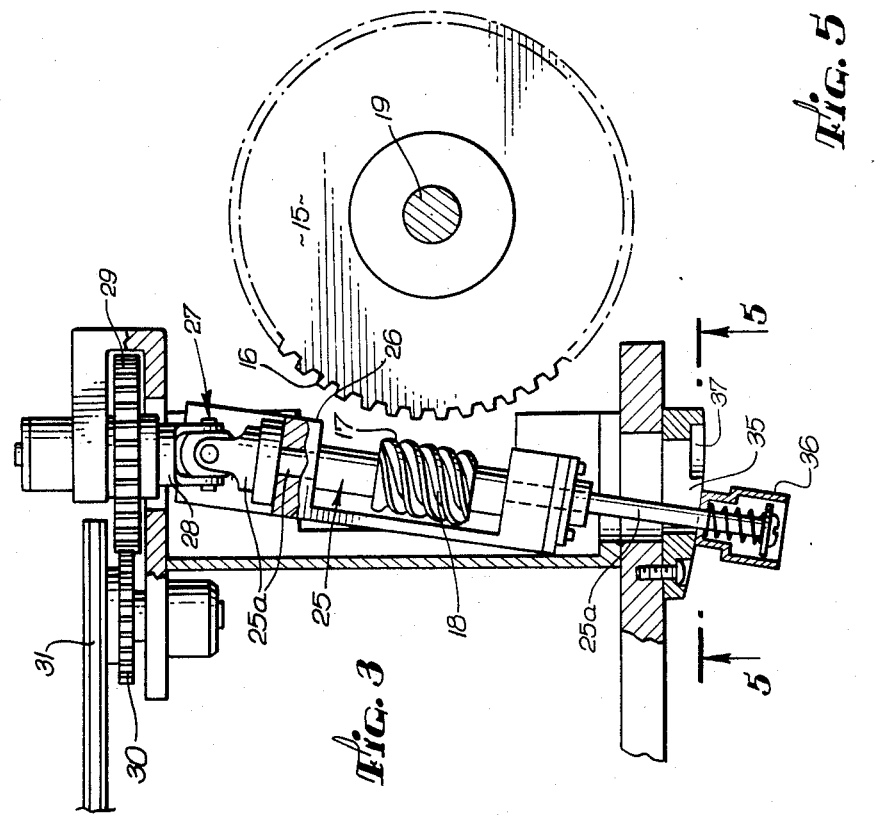
Fig. 3

BALANCING GEAR APPARATUS FOR REMOTE POSITIONING DEVICE

BACKGROUND OF THE INVENTION

1. Field of the Invention

The present invention generally relates to balancing equipment for multi-direction positioning apparatus, and particularly to those devices which require accurate balancing such as cameras and other optical systems.

2. Prior Art

There are numerous devices disclosed by the prior art which involve either mounting devices for equipment such as a camera, or worm gear assemblies which are described independent of any specific application. One of the devices taught by the prior art discloses a panning and tilting mount for a camera. Although the present invention is usable in applications other than those which would occur in the use of film or video cameras, for the purpose of example, these devices shall be used for descriptive use only. The devices taught by the prior art provide separate motivating force elements for the panning and tilting functions, respectively. A motor is mounted on a suitable panel and is adjustably positioned by connecting the motive force through a worm gear assembly. As the worm gear is caused to rotate, the entire motor housing is thereby rotated due to the cooperation between the worm gear and the stationary gear. One of the problems inherent in this device is created by the application itself. Since motion picture or video cameras are unsymmetrical in one or more of their three axes, it is clear that the inbalance which is caused as a result of the unsymmetrical mass could be translated into an inability to accurately position the camera. The present invention substantially resolves this problem by providing for static balancing of the camera prior to operation but without disconnecting any major subsystems. By allowing the worm gear to be disengaged from the stationary, master drive gear associated with each of the axes of rotation, the camera can be statically balanced to provide for accurate positioning control.

Other devices taught by the prior art employ worm gears which can be disengaged from a second gear with which it meshes. In these devices, the worm gear can be disengaged to permit the meshing gear to be rotated without interference from the worm gear and the coupled assembly. As an example, where the meshed gear is coupled to a drum employed to wind cable, a separate power force can rotate the drum to wind the cable after which the worm gear can be engaged to permit more accurate adjustment. The inadequacies of these devices is apparent. The worm gear is employed solely for the purpose of providing small changes in the position of the meshed gear and the equipment to which it is attached. The present invention employs the worm gear as part of the power train between the motive force used as the source of power to change the position of the camera along a given axis and the camera positioning drive gear itself. In the engaged position, the worm gear is fully meshed to the main drive gear and, through the universal joint, to the camera positioning controls. In order to balance the camera, the worm gear is disengaged thereby uncoupling the camera positioning controls from the main drive gear.

The present invention provides an improved gear apparatus for remote positioning of a camera or like device. By coupling each of the main drive gears to the positioning controls through the engageable worm gear, the camera can be statically balanced independent of any forces imposed by the main drive gears. By providing for motive force in each of the two axes of movement, substantially all static effects of the mass of the camera can be compensated for prior to operation.

SUMMARY OF THE INVENTION

The present invention comprises a remote positioning device for cameras and the like employing an improved balancing gear apparatus. Although the present invention can be used with any type of equipment which requires accurate positioning, for the purpose of example, the present invention shall be described with respect to film and/or video cameras. The present invention is employed as part of a remote positioning device for cameras. The positioning apparatus must be capable of panning and tilting the camera through linear adjustments along the horizontal and vertical axes of the camera. In addition, it is necessary to have the center of gravity of the camera substantially coincide with the intersection of the planes of rotation. In order to accomplish the latter, it is necessary that the camera be statically balanced along the two axes in order to compensate for the unsymmetrical mass of the camera. In order to perform the static balancing of the camera, an engageable worm gear assembly is disposed intermediate the main drive gear for each of the respective axes of the camera positioning controls. During the positioning operation, power supplied through the main drive gear is transmitted through the worm gear. The worm gear is coupled by a universal joint to a series of output gears which can be used to input the rotational power used to position the camera in the respective axis. By permitting the worm gear to be disengaged from the main drive gear without disconnecting any major mechanical or electronic subsystem, the camera can be balanced without interference with any other operative subsystem of the remote positioning apparatus.

It is therefore an object of the present invention to provide an improved remote positioning apparatus for cameras and the like.

It is another object of the present invention to provide a remote positioning apparatus which includes means for statically balancing the supported device.

It is still another object of the present invention to provide a remote positioning apparatus which employs disengageable worm gear assemblies to isolate the camera from the power force for the main drive gears.

It is still yet another object of the present invention to provide an improved balancing gear apparatus for remote positioning devices which are simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

FIG. 3 illustrates main drive gear and worm gear assembly illustrating worm gear in the disengaged position.

FIG. 4 is a top plan view of a worm gear assembly in accordance with t present invention.

FIG. 5 is a partial, cross-sectional view of the worm gear assembly taken through line 5—5 of FIG. 3.

DESCRIPTION OF THE PRESENTLY PREFERRED EMBODIMENT

Figure 1:
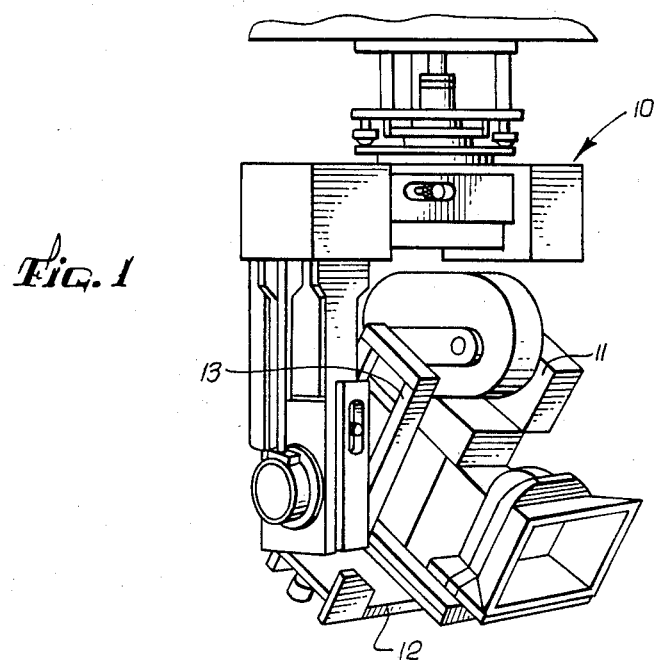
FIG. 1 is a perspective view illustrating a camera mounted upon a remote positioning device.

The present invention is employed as part of a remote positioning device for cameras and the like. A television or motion picture camera requires that it be subject to panning and tilting for the purpose of optically recording a scene. This function necessitates that the camera be moveable in the horizontal and vertical planes of rotation without angular disturbance. Referring now to FIG. 1, a better understanding of the use of the present invention can be seen wherein a camera mounted upon a remote positioning apparatus which is generally designated by the reference numeral 10. Camera 11 is secured to positioning visible bases 12 and 13 which securely mount the camera 11. As can be seen by the exemplary form of camera 11, it is substantially unsymmetrical. The visible mounting bases 12 and 13 provide a mounting frame upon which camera 11 is secured. Since camera 11 is not symmetrical, it is necessary to appropriately position the center of gravity of the camera along its horizontal and vertical axes. By properly balancing the camera 11 through adjustment members which are not part of the present invention, camera 11 can be panned and tilted through a series of linear movements which will be free of angular disturbances. Remote positioning apparatus 10 is a unit which is to be placed in a location where it is not readily accessible by the user and is rotated through the use of remote positioning equipment which is conventional and known in the trade.

As stated hereinabove, camera 11 is secured to the mounting base which will control rotation of camera 11 along the horizontal and vertical axes of rotation. An object of the present invention is to provide means whereby the center of gravity of camera 11 can be positioned at the intersection of the horizontal and vertical axes of rotation. In this manner, along any given axis, the mass of the camera can be balanced. On the other hand, if any meaningful changes in the location of securing equipment is necessary to carry out the balancing procedures, that in and of itself could change the center of gravity thereby precluding the user from accurately balancing the camera.

Figure 2:
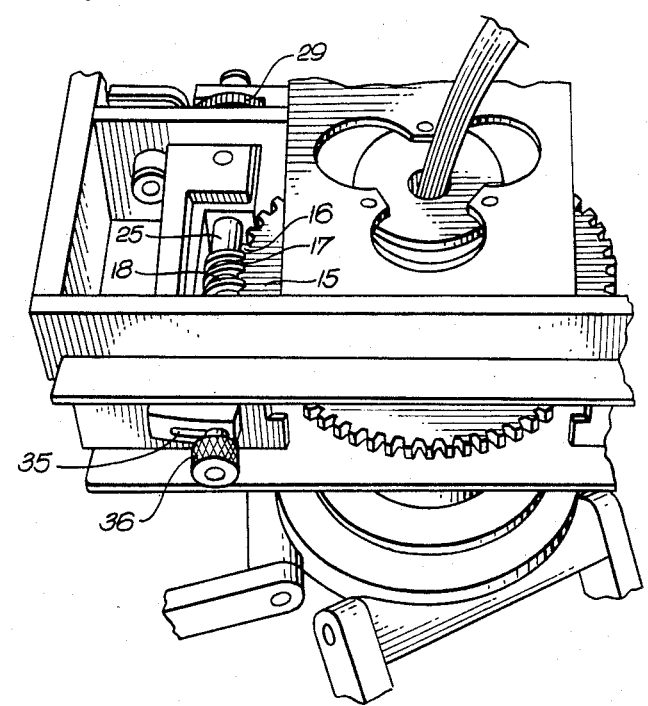
FIG. 2 illustrates the engaged main drive gear and worm gear assembly constructed in accordance with the present invention.

The present invention can be best understood by references to FIGS. 2, 3, 4 and 5. FIG. 2 illustrates a portion of the power train between the source of motive power and the mounting base associated with a specific plane of movement. Since all three planes are identical for the purpose of this discussion, the following shall be applicable to movement of the camera in all planes of rotation. Drive gear 15 is securely affixed to the respective mounting base which is in turn secured to the camera with respect to a single plane of movement. Main drive gear 15 is constructed and arranged for engaging with its circumferential teeth 16, the mating teeth 17 of worm gear 18. As will be described in further detail hereinbelow, FIG. 2 illustrates worm gear 18 and main drive gear 15 in the engaged position. As shown in FIG. 2, the application of rotatry power to worm gear 18 will cause the rotation of main drive gear 15 about its axis 19 which will in turn translate the rotation to the camera in the applicable plane of rotation. Although the preferred embodiment of the present invention employs a source of rotary power for driving the gear trains, it is understood that conventional linear power sources could be employed.

The structure of the worm gear assembly can be best seen by reference to FIG. 4. Worm gear 16 is mounted upon shaft 25, section 25a being appropriately journeled through yoke 26 and extending into universal joint 27. Universal joint 27 couples shaft 25a and shaft 28 whereby the angle between the shafts can be varied while they are rotating. The input to shaft 28 is coupled to rotary gear 29. The rotation of rotary gear 29 is transmitted through engaged gear 30 and the belt drive gear 31 to which it is coupled.

It is essential to isolate drive gear 15 from the power source input from belt drive gear 31 during the balancing procedure. The shaft upon which worm gear 18 is mounted can be moved with respect to shaft 20 through the use of universal joint 27. Universal joint allows the axis of worm gear 17 to change its angle with respect to shaft 28 and disengage worm gear teeth 17 from the circumferential teeth 16 of main drive gear 15. As can be best seen in FIG. 5, shaft 25b extends through elongated slot 35. Shaft 25b is terminated with a conventional spring-loaded knob 36 which will permit shaft 25b to be locked into a stationary position or detent such as that designated by the reference numeral 37. FIG. 3 illustrates the disengagement of worm gear 18 from main drive gear 15 as a result of the movement of shaft 25b from its locked position 37. Since all power is input through the rotation of belt drive gear 31, any rotation of worm gear 18 will have no effect upon the rotation of main drive gear 15.

Since camera 11 is to be statically balanced after being mounted upon remote positioning apparatus 10, all mechanical, power and electronic units will be in operation. Since it is an objective of the present invention to assure that the center of gravity of camera 11 lies at the intersection of the horizontal and vertical axes of rotation, the change in position of moveable mechanical parts must be kept at a minimum. In the present invention, camera 11 can be statically balanced in the horizontal and vertical axes of rotation by disengaging worm gears 18 from the respective main drive gears 15. As shown in FIGS. 3 and 5, shaft 25b is moved along slot 35 away from locked position 37 thereby disengaging the teeth 18 of worm gear 17 from the teeth 16 of main drive gear 15. Since universal joint 27 will permit a change in angular orientation between shaft 25b and shaft 28, nothing will interfere with the movement of shaft 25b to the position shown in FIG. 5. Following the disengagement of worm gear 18 from main drive gear 15, the camera 11 can be statically balanced to compensate for the mass of camera 11 in the two axes of rotation.

I claim:

1. A balancing gear apparatus for use with a remote camera positioning device including a rotary power source comprising:

(a) a main drive gear for transmitting rotary power to the camera in a given plane of rotation;

(b) a disengageable gear assembly comprising:

(i) a rotary gear coupled to the rotary power source;
(ii) a cylindrical worm gear having first and second ends, said worm gear including spiral gear threads about the circumference thereof for cooperative engagement with the main drive gear;
(iii) a first cylindrical shaft having first and second ends, the first end thereof being coupled to the rotary gear;
(iv) a second cylindrical shaft being axially aligned and in end abutment with the second end of said worm gear;
(v) a universal joint being coupled intermediate the second end of said first cylindrical shaft and the first end of said worm gear whereby the axis of said worm gear and said second cylindrical shaft can be angularly deflected with respect to the axis of said first shaft; and
(c) guide means for defining the deflection of said second cylindrical shaft, said guide means including a channel having first and second positions aligned with the plane of said main drive gear, said second cylindrical shaft being disposed within said channel.

* * * * *